United States Patent
Chen et al.

(10) Patent No.: US 10,651,439 B2
(45) Date of Patent: *May 12, 2020

(54) INTEGRATED BATTERY CELL MODULES WITH PLUG-IN BATTERY CELLS FOR ELECTRIC VEHICLES

(71) Applicant: SF Motors, Inc., Santa Clara, CA (US)

(72) Inventors: Chien-Fan Chen, Santa Clara, CA (US); Ying Liu, Santa Clara, CA (US)

(73) Assignee: SF MOTORS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,974

(22) Filed: Dec. 26, 2018

(65) Prior Publication Data

US 2019/0296285 A1    Sep. 26, 2019

Related U.S. Application Data

(63) Continuation of application No. 16/153,123, filed on Oct. 5, 2018.

(60) Provisional application No. 62/646,976, filed on Mar. 23, 2018.

(51) Int. Cl.
| | | |
|---|---|---|
| *H01M 2/10* | (2006.01) | |
| *H01M 2/30* | (2006.01) | |
| *H01M 2/20* | (2006.01) | |
| *H01M 2/04* | (2006.01) | |
| *H01M 2/06* | (2006.01) | |
| *H01M 2/26* | (2006.01) | |
| *B60L 50/64* | (2019.01) | |

(52) U.S. Cl.
CPC .......... *H01M 2/1077* (2013.01); *B60L 50/64* (2019.02); *H01M 2/06* (2013.01); *H01M 2/26* (2013.01); *H01M 2/305* (2013.01)

(58) Field of Classification Search
CPC ........ H01M 2/1077; H01M 2/26; H01M 2/06; H01M 2/305; B60L 50/64
USPC .......................................... 429/99
See application file for complete search history.

(56) References Cited

U.S. PATENT DOCUMENTS

2011/0250488 A1\* 10/2011 Park ..................... H01M 2/0202
429/163
2015/0280185 A1\* 10/2015 Lampe-Onnerud .........................
H01M 2/1077
429/9

\* cited by examiner

*Primary Examiner* — Milton I Cano
*Assistant Examiner* — Christian Roldan
(74) *Attorney, Agent, or Firm* — Foley & Lardner LLP; James De Vellis

(57) ABSTRACT

Provided herein are battery cell modules of battery packs to power electric vehicles. The battery cell modules can include a plurality of battery cells, each of which can include a housing having a first end and a second end, the housing defining an inner region. An electrode structure can be disposed in the inner region defined by the housing, the electrode structure including a cathode tab that extends from the first end of the housing, and an anode tab that extends from the first end of the housing. A lid can be coupled with the first end of the housing, the lid including a cathode tab opening and an anode tab opening. A base includes a plurality cathode sockets receiving respective cathode tabs of the plurality of battery cells and a plurality of anode sockets receiving respective anode tabs of the plurality of battery cells.

19 Claims, 8 Drawing Sheets

INTEGRATED BATTERY CELL MODULES WITH PLUG-IN BATTERY CELLS FOR ELECTRIC VEHICLES

RELATED APPLICATION

The present application claims the benefit of priority under 35 U.S.C. § 120 as a continuation of U.S. patent application Ser. No. 16/153,123, filed on Oct. 5, 2018 and titled "INTEGRATED BATTERY CELL MODULES WITH PLUG-IN BATTERY CELLS FOR ELECTRIC VEHICLES," which claims the benefit of priority under 35 U.S.C. § 119(e) to U.S. Provisional Application 62/646,976, filed on Mar. 23, 2018, titled "PLUGGABLE BATTERY CELL MODULE," each of which is incorporated herein by reference in its entirety.

BACKGROUND

Batteries can include electrochemical cells to supply electrical power to various electrical components connected thereto. Such batteries can be installed in a vehicle such as an automobile to provide electrical energy to various electrical systems installed within the vehicle.

SUMMARY

The present disclosure is directed to battery cell modules of battery packs for powering electrical vehicles. The disclosed battery cell modules can have battery cells including cathode and anode tabs that can be plugged into corresponding cathode sockets and anode sockets in a base. Such a configuration can allow for improvement the reliability of the battery cell module, and a reduction of contact resistance between the battery cells and bus bars of the battery cell modules.

At least one aspect is directed to a battery cell module for electric vehicles. The battery cell module can include a plurality of battery cells. Each battery cell of the plurality of battery cell can include a housing having a first end and a second end, the housing defining an inner region. The battery cell can include an electrode structure disposed in the inner region defined by the housing, the electrode structure including a cathode tab that extends from the first end of the housing, and an anode tab that extends from the first end of the housing. The battery cell includes a lid coupled with the first end of the housing, the lid including a cathode tab opening and an anode tab opening, the cathode tab extending through the cathode tab opening and the anode tab extending through the anode tab opening. The battery cell module includes a base including a plurality cathode sockets and a plurality of anode sockets, the plurality of cathode sockets receiving respective cathode tabs of the plurality of battery cells and the plurality of anode sockets receiving respective anode tabs of the plurality of battery cells.

At least one aspect is directed to a method of providing battery packs for electric vehicles. The method can include providing a plurality of battery cells. Providing the battery cell includes providing a housing having a first end and a second end, the housing defining an inner region. Providing the battery cell includes disposing an electrode structure in the inner region defined by the housing, the electrode structure comprising a cathode tab and an anode tab extending out of the first end of the housing. Providing the battery cell includes disposing a lid proximate to the first end of the housing, the lid having a cathode tab opening and an anode tab opening, the cathode tab extending through the cathode tab opening and the anode tab extending through the anode tab opening. Providing the battery cell module includes providing a base including a plurality cathode sockets and a plurality of anode sockets. Providing the battery cell module includes plugging the cathode tab of each of the plurality of battery cells into the respective cathode socket of the plurality of cathode sockets and plugging the anode tab of each of the plurality of battery cells into the respective anode socket of the plurality of anode sockets.

At least one aspect is directed to an electric vehicle. The electric vehicle can include a battery cell module of a battery pack to power the electric vehicle. The battery cell module can include a plurality of battery cells. Each battery cell of the plurality of battery cell can include a housing having a first end and a second end, the housing defining an inner region. The battery cell can include an electrode structure disposed in the inner region defined by the housing, the electrode structure including a cathode tab that extends from the first end of the housing, and an anode tab that extends from the first end of the housing. The battery cell includes a lid coupled with the first end of the housing, the lid including a cathode tab opening and an anode tab opening, the cathode tab extending through the cathode tab opening and the anode tab extending through the anode tab opening. The battery cell module includes a base including a plurality cathode sockets and a plurality of anode sockets, the plurality of cathode sockets receiving respective cathode tabs of the plurality of battery cells and the plurality of anode sockets receiving respective anode tabs of the plurality of battery cells.

At least one aspect is direct toward a method. The method can include providing a battery pack that can power an electric vehicle. The battery pack can include at least one battery cell module. The battery cell module can include a plurality of battery cells. Each battery cell of the plurality of battery cells can include a housing having a first end and a second end. The housing can define an inner region. Each battery cell can include an electrode structure disposed in the inner region defined by the housing. The electrode structure can include a cathode tab that extends from the first end of the housing, and an anode tab that extends from the first end of the housing. Each battery cell can include a lid coupled with the first end of the housing. The lid can include a cathode tab opening and an anode tab opening. The cathode tab can extend through the cathode tab opening. The anode tab can extend through the anode tab opening. Each battery cell can include a base. The base can include a plurality of cathode sockets and a plurality of anode sockets. The plurality of cathode sockets can receive respective cathode tabs of the plurality of battery cells. The plurality of anode sockets can receive respective anode tabs of the plurality of battery cells.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of battery cells for battery packs in electric vehicles. The various concepts introduced above and discussed in greater detail below can be implemented in any of numerous ways.

Described herein are battery cell modules that can be included in battery packs for use in electric vehicles for an automotive configuration. An automotive configuration includes a configuration, arrangement or network of electrical, electronic, mechanical or electromechanical devices within a vehicle of any type. An automotive configuration can include battery packs for electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

A battery cell module can include battery cells having positive and negative terminals. Each battery cell can include a can or container containing an electrode structure (sometimes referred to herein as a jelly roll), which includes an anode and a cathode and separator material interposed between the anode and the cathode. An electrolyte can be added to the electrode structure. The electrolyte can serve as a catalyst by promoting the movement of ions from the cathode to the anode. The electrolytes can include liquids, gels, or dry polymers. The battery cells can include a battery cap or lid attached to the can or container that safely encloses the electrode structure and the electrolyte. The cathodes two or more battery cells can be electrically connected to a first bus-bar by wire bonding. The anodes of the two or more battery cells can be electrically connected to a second bus-bar by wire bonding as well.

A battery cell having wire bonding connections with bus-bars can suffer from various drawbacks. For example, the wire bonding between the cathode or the anode terminal and the respective bus bars can fail or break. One reason for the failure can be the small surface area available on the battery caps for bonding the wire. The small surface area can cause unreliable bonding between the battery cells and the wire. This failure can result in the battery cells being disconnected from the bus-bar, and causing undesired drop in the power provided by the battery pack. In addition, the small surface area can result in a relatively small contact area between the battery cell and the wire for wire bonding, thereby resulting in high resistance at the contact area as well as increasing the time necessary to manually (or otherwise) assemble the wire bond.

To address these and other technical drawbacks, the battery cell module and battery pack described herein can eliminate the need for wire bonding to make electrical contact between a bus-bar and the battery cell. Instead, the battery cell module can include battery cells with cathode and anode tabs and a base that includes a number of cathode and anode sockets. The cathode tab and the anode tab of each battery cell can be plugged-in or inserted into the corresponding cathode and anode socket on the base. The base includes bus bars that are electrically connected to two or more sockets of in the base. For example, a cathode bus bar is electrically connected to two or more cathode sockets and an anode bus bar is electrically connected to two or more anode sockets. Thus, the battery cells form connections with the bus bars without including any wire bonding. The lack of wire bonding improves the reliability of the battery cell module. Further, the cathode tab and anode tab of the battery cells are designed to have a large surface area. Thus, the cathode and anode tabs, when in contact with the respective sockets on the base, form an electrical contact area that is larger than that provided by a wire bonding. Therefore, the contact resistance between the battery cells and the bus bars is less compared to that when wire bonding is used. Furthermore, the ability to plug-in the battery cells to the base provides ease of replacing defective battery cells from the battery cell module. This is in contrast with the time consuming process of replacing wire-bonded batter cells.

Figure 1:
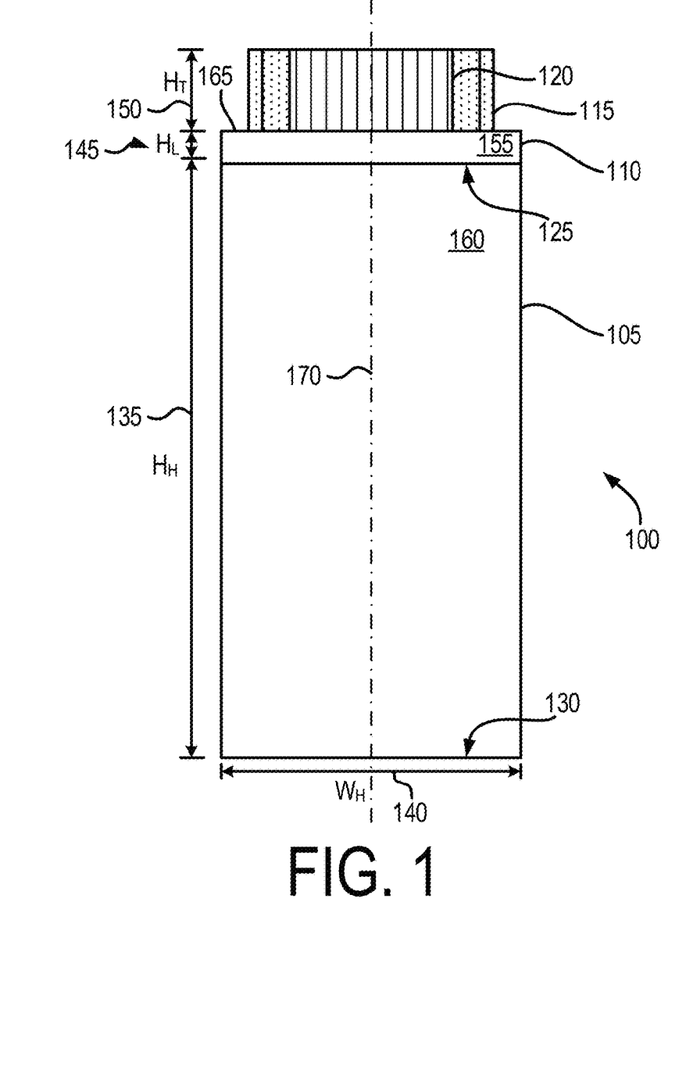
FIG. 1 depicts a side view of an example battery cell of a battery cell module to power an electric vehicle.

FIG. 1 depicts a side view of an example battery cell 100. The battery cell 100 can include a housing 105, a lid 110, a cathode tab 115, and an anode tab 120. The housing 105 can have a first end 125 and a second end 130 opposite to the first end 125. The housing 105 can be hollow and house an electrolyte structure that can include the cathode tab 115 and the anode tab 120. The first end 125 can be at least partially open to allow the cathode tab 115 and the anode tab 120 to extend out of the housing 105 and beyond the first end 125 along a longitudinal axis of the housing 105. The second end 130 can be at least partially closed to retain the electrolyte structure within the housing 105.

The housing 105 can have a height 135 (HO measured as a distance between the first end 125 and the second end 130. In some examples, the height 135 of the housing 105 can have a value between 60 millimeters (mm) and 80 mm. The housing 105 can have a width 140 (WO between 16 mm and 25 mm. The height 135 of the housing 105 can be greater than the width 140 of the housing 105. For example, the height 135 of the housing 105 can be at least three times the width 140 of the housing 105. The housing 105 can be cylindrical with a cross-sectional shape that can be circular, elliptical, squared, rectangular, or any polygonal (regular or irregular) shape. The housing 105 can be formed from electrically insulating materials such as plastics and polymers, or other electrically insulating or non-conductive material. The housing 105 can include materials such as metals (e.g., stainless steel, Aluminum), for example, to improve the strength and structural stability of the housing 105. The housing 105 can be formed using thermally conducting materials, to conduct and transfer heat generated by the electrode structures to outside of the housing 105.

The lid 110 can attach to the housing 105 at the first end 125 of the housing 105. The lid 110 can be attached to the housing 105 by an adhesive, a sealant, or by a mechanical engagement with the housing 105, such as, for example, a crimping engagement, where the lid 110 can be crimped around an outer periphery of the first end 125 of the housing 105. The lid 110 can have a lid height 145 (HL). The lid height 145 can be less than the height 135 of the housing. For example, the lid height 145 can have a value between 1 mm and 2 mm. The lid 110 can have a width that is the same as or similar to (e.g., within +/−10% of) the width 140 of the housing 105. The lid 110 can have a shape that is the same as or similar to (e.g., within +/−10% of) the shape of the housing 105. For example, both the housing 105 and the lid 110 can have the same circular cross-sectional shape of equal width. A lateral outer surface 155 of the lid 110 can be flush with a lateral outer surface 160 of the housing 105. In some examples, the lid 110 can have a width that is less than or greater than the width 140 of the housing 105. The lid 110 can be formed of an electrically insulating material such as plastics and polymers, or other electrically insulating or non-conductive material.

The cathode tab 115 and the anode tab 120 can extend beyond the lid 110 along a longitudinal axis 170 of the battery cell 100. For example, the cathode tab 115 and the anode tab 120 can have a height 150 (HT) of between 1 cm and 2 cm measured in relation to a first surface 165 of the lid 110. The cathode tab 115 and the anode tab 120 are connected to the electrolyte structure housed within the housing 105. The cathode tab 115 and the anode tab 120 extend out of the first end 125 of the housing and through the lid 110. In some examples, the cathode tab 115 and the anode tab 120 have equal heights relative to the first surface 165 of the lid 110. In some examples, the cathode tab 115 and the anode tab 120 can have unequal heights. For example, the cathode tab 115 can heave a height that is greater than the height of the anode tab 120 and vice-versa.

Figure 2:
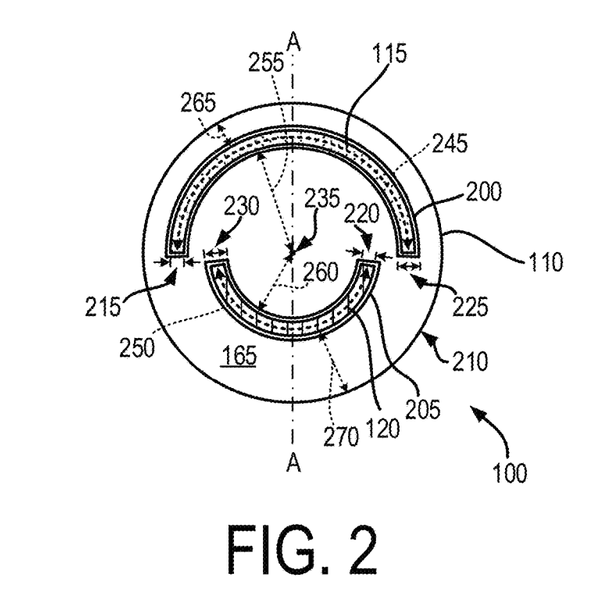
FIG. 2 shows a top view of the battery cell shown in FIG. 1.

FIG. 2 shows a top view of the battery cell 100 shown in FIG. 1. The top view shows the first surface 165 of the lid 110, the cathode tab 115, and the anode tab 120. The lid 110 can have a circular shape that has a width that is equal to the width 140 (FIG. 1) of the housing 105. The first surface 165 of the lid 110 can define a cathode tab opening 200 and an anode tab opening 205. The cathode tab opening 200 allows the cathode tab 115 to pass through the lid 110 and the anode tab opening 205 allows the anode tab 120 to pass through the lid 110. The cathode tab 115 can have a thickness 215 with values between 1 mm and 1.5 mm. The anode tab 120 can have a thickness 220 with values between 1 mm and 1.5 mm. In some examples, the thickness 215 of the cathode tab 115 can be equal to the thickness 220 of the anode tab 120. In some examples, the thickness 215 of the cathode tab 115 can be greater than the thickness 220 of the anode tab 120. In some examples, the thickness 215 of the cathode tab 115 can be less than the thickness 220 of the anode tab 120. The cathode tab opening 200 can have a width 225 that is greater than the thickness 215 of the cathode tab 115. Similarly, the anode tab opening 205 can have a width 230 that is greater than the thickness 220 of the anode tab 120. In some examples, the cathode tab opening 200 can have a width 225 such that the outer sidewalls of the cathode tab 115 are in contact with the inner sidewalls of the cathode tab opening 200. In some examples, the anode tab opening 205 can have a width 230 such that the outer sidewalls of the anode tab 120 are in contact with the inner sidewalls of the anode tab opening 205.

The cathode tab 115 can have a first curved shape and the anode tab 120 can have a second curved shape. For example, the cathode tab 115 can have a circular arc shape with the center of the arc being positioned at a center 235 of the battery cell 100 or the lid 110. In some examples, the center 235 of the battery cell 100 or the lid 110 can be coincident on a longitudinal axis 170 of the battery cell 100 that is normal to the first surface 165 of the lid 110. The anode tab 120 can have a circular arc shape with the center of the arc being positioned at the center 235 of the battery cell 100. The cathode tab 115 and the anode tab 120 can have centers that are not coincident. In some examples, the cathode tab 115 and the anode tab 120 can have a curved shape that is different from a circular arc shape. For example, the cathode tab 115 and the anode tab 120 can have an elliptical arc shape, or a parabolic arc shape. In some examples, the cathode tab 115 and the anode tab 120 can have a serpentine shape. In some examples, the cathode tab 115 and the anode tab 120 can have a shape of a full circle or ellipse, instead of a shape of a circular or elliptical arc. The cathode tab 115 and the anode tab 120 can be concentric. The cathode tab 115 can be positioned outside of the anode tab 120. In some examples, the anode tab 120 can be positioned outside of the cathode tab 115.

The cathode tab 115 and the anode tab 120 can have a shape that is at least partially linear. For example, the cathode tab 115 or the anode tab 120 can have a "U" shape, which can include portions that are curved and portions that are linear. The cathode tab 115 and the anode tab 120 can have a shape that is made of only linear segments. For example, the cathode tab 115 and the anode tab 120 can be have a zig-zag shape that is formed of linear segments that are connected end-to-end to form a zig-zag shape. In some examples, the cathode tab 115 and the anode tab 120 can have a "U" shape formed of only linear segments.

The shape, form, or trajectory of the cathode tab 115 can be the same as or similar to the shape of the anode tab 120. For example, as shown in FIG. 2, both the cathode tab 115 and the anode tab 120 have a circular arc shape but of different lengths. The shape of the cathode tab 115 can be different from the shape of the anode tab 120. For example, the cathode tab 115 can have a circular arc shape, while the anode tab 120 can have an elliptical arc shape. The cathode tab 115 and the anode tab 120 can have a different shape near a portion of the respective tabs that is nearer to the electrolyte structure, than a portion of the respective tabs that is exposed beyond the lid 110.

The shapes of the cathode tab 115 and the anode tab 120 can be designed to increase the exposed surface area of the tabs. The increased surface area can reduce the contact resistance between the tabs and their respective sockets on a base in which the tabs are plugged in. The increase in the surface area can also increase the friction between the sidewalls of the tabs and the sidewalls of their respective sockets, thereby improving the adhesion of the battery cell 100 to the base. This improvement in adhesion can reduce the risk of the battery cell 100 being dislodged from its respective socket during operation. The example shapes: both curved and linear, discussed above can increase in the surface area of the cathode tab 115 and the anode tab 120, thereby reducing the contact resistance and increasing the adhesion of the battery cell 100 to the respective socket. In some examples, the cathode tab 115 or the anode tab 120 can be discontinuous. For example, the cathode tab 115 or the anode tab 120 can be formed of separate discontinuous segments. The separate discontinuous segments of the cathode tab 115 can be attached to the cathode of the electrolyte structure. Similarly, the separate discontinuous segments of the anode tab 120 can be attached to the anode of the electrolyte structure.

A length of the cathode tab 115 can be greater than a length of the anode tab 120. For example, a cathode tab length 245 of the cathode tab 115 can be greater than an anode tab length 250 of the anode tab 120. In some examples, the anode tab length 250 can be greater than the cathode tab length 245. In some examples, the cathode tab length 245 can be equal to the anode tab length 250. As an example, the cathode tab length 245 can have values between 35 mm and 45 mm, and the anode tab length 250 can have values between 20 mm and 30 mm.

The cathode tab 115 and the anode tab 120 can be positioned at unequal distances from the center 235 of the lid 110. The cathode tab 115 can be positioned farther from the center 235 than the anode tab 120. In some examples, the anode tab 120 can be positioned farther from the center 235 than the cathode tab 115. A distance 255 of the cathode tab 115 from the center 235 can have values between 4.5 mm and 5.5 mm. A distance 260 of the anode tab 120 from the center 235 can have values between 3.5 mm and 4.5 mm.

The cathode tab 115 and the anode tab 120 can be positioned at unequal distances from the periphery 210 of the lid 110. For example, the cathode tab 115 can be positioned closer to the periphery 210 than the anode tab 120. In some examples, the anode tab 120 can be positioned closer to the periphery 210 than the cathode tab 115. As an example, a distance 265 of the cathode tab 115 from the periphery 210 of the lid 110 can have values between 2 mm and 3 mm, and a distance 270 of the anode tab 120 from the periphery 210 of the lid 110 can have values between 4 mm and 5 mm.

The cathode tab 115 and the anode tab 120 can be positioned on separate halves of the lid 110. For example, the first surface 165 of the lid 110 can define a line segment (such as a diameter or a diagonal) that separates the area of the first surface 165 in two equal halves. The cathode tab 115 and the anode tab 120 can be relatively positioned such that the cathode tab 115 is positioned entirely in one half and the anode tab 120 is positioned entirely in the second half. In some examples, the cathode tab 115 and the anode tab 120 can be positioned entirely in the same half.

Figure 3:
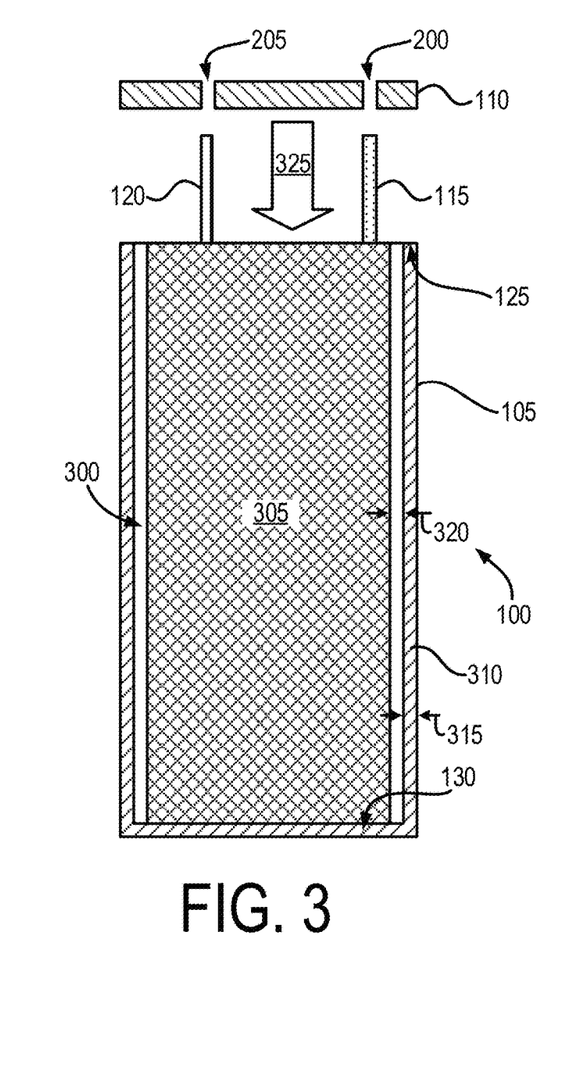
FIGS. 3 and 4 show a cross-sectional view of the battery cell shown in FIGS. 1 and 2.
Figure 4:
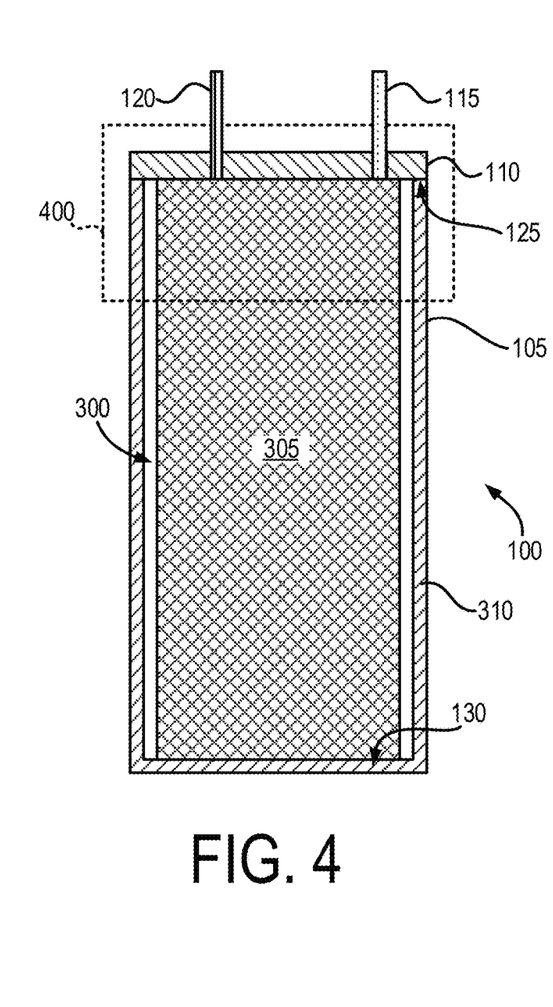

FIGS. 3 and 4 show a cross-sectional view of the battery cell 100 shown in FIGS. 1 and 2. In particular, FIGS. 3 and 4 show a cross-sectional view of the battery cell 100 through a plane that is normal to the first surface 165 of the lid 110 and is along the axis A-A. FIG. 3 shows the battery cell 100 with the lid 110 removed while FIG. 4 shows the battery cell 100 with the lid 110 in place over the housing 105. Referring to FIG. 3, the housing 105 defines an inner region 300 in which an electrode structure 305 is disposed. The electrode structure 305 can include a jelly roll type electrode structure, which includes an anode and a cathode and a separator material interposed between the anode and the cathode. The anode, the cathode, and the separator material can be rolled into a cylindrical structure. Electrode structures other than a jelly roll can be used. For example, electrode structures such as a stacked electrode structure, in which the anode, the cathode, and the separator are arranged in individual alternating plates, can be utilized. The electrode structure can include a rolled stack of sheets of a cathode, a separator, and an anode. The stack of sheets can be rolled into a cylindrical electrode structure for instance, which can be inserted into the inner region 300. In one example, the cathode sheet can include aluminum, and the anode sheet can include copper. Each anode sheet can be coupled to the anode tab 120 and each cathode sheet can be connected to the cathode tab 115. The anode tab 120 and the cathode tab 115 extend outwardly from, for instance along a longitudinal axis of, the electrode structure 305. The inner region 300 can also house an electrolyte. The electrolyte can serve as a catalyst by promoting the movement of ions from the cathode to the anode. The electrolyte can include liquids, gels, or dry polymers.

The housing 105 can have sidewalls 310, a thickness 315 of which can be uniform throughout the housing 105. In some examples, the thickness 315 of the sidewall 310 can be between 0.5 mm and 1 mm. The thickness of the sidewall 310 can be greater at the second end 130 of the housing 105 compared to that in the remainder of the housing 105. For example, the thickness of the sidewall 310 at the second end 130 can have a value between 0.5 mm and 1 mm. The thicker sidewall 310 at the second end 130 of the housing 105 can provide improved mechanical strength and protection to the housing.

The electrode structure 305 can be positioned within the inner region 300 such that the outer surfaces of the electrode structure 305 define a gap 320 in relation to the inner surfaces of the lateral sidewalls 310 of the housing 105. In some examples, the electrode structure 305 is positioned within the inner region 300 such that there is no gap between the outer surfaces of the electrode structure 305 and the inner surfaces of the lateral sidewalls 310. As an example, the gap 320 can have values between 0 mm to 1 mm.

The cathode tab 115 and the anode tab 120 extend from the first end 125 of the housing 105 along the longitudinal axis 170 of the battery cell 100. The lid 110 includes the cathode tab opening 200 and the anode tab opening 205. The lid 110 can be lowered onto the housing 105 in a direction indicated by the arrow 325 such that the cathode tab 115 extends through the cathode tab opening 200 and the anode tab 120 extends through the anode tab opening 205. The lid 110 can be attached to the first end 125 of the housing 105 by an adhesive, a sealant, or by a mechanical engagement with the housing 105, such as, for example, a crimping engagement.

FIG. 4 shows the cross-sectional view of the battery cell 100 with the lid 110 positioned on the first end 125 of the housing 105. The lid 110 can be flush against the electrode structure 305 to securely hold the electrode structure within the housing 105. In some examples, additional features such as a spring can be disposed between the lid 110 and the electrode structure 305 to secure electrode structures of different sizes.

Figure 5:
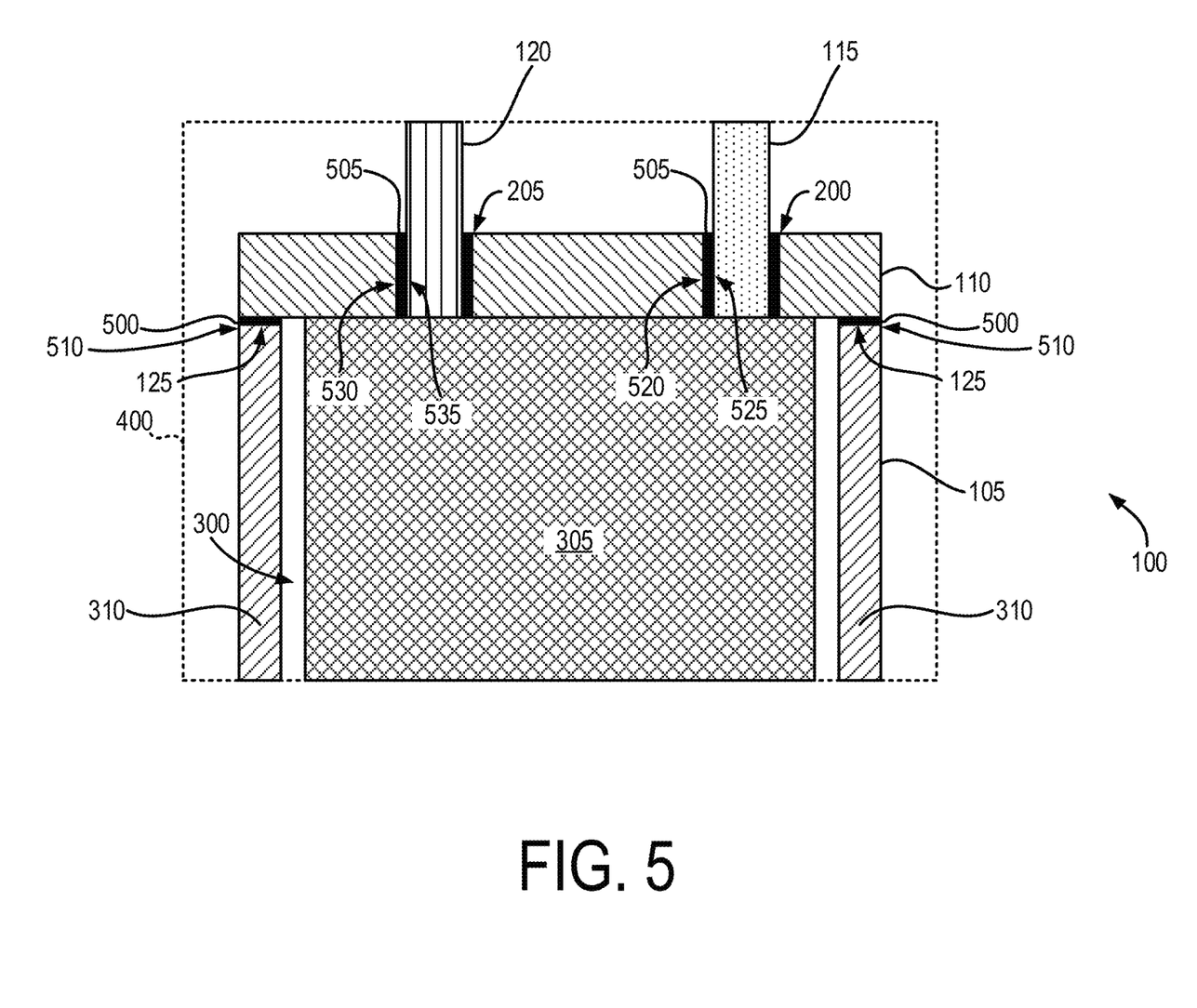
FIG. 5 shows an expanded view of the cross-sectional view of the battery cell shown in FIG. 4.

FIG. 5 shows an expanded view of the cross-sectional view of the battery cell 100 shown in FIG. 4. In particular, FIG. 5 shows an expanded view of the portion of the battery cell 100 indicated by the rectangle 400 in FIG. 4. FIG. 5 shows a lid sealant 500 disposed between at least a portion of the lid 110 and at least a portion of the first end 125 of the housing 105. The lid sealant 500 can be disposed over an entire area, or a portion thereof, of the sidewalls 310 at the first end 125 of the housing 105 that faces the lid 110. The lid sealant 500 can be positioned along at least a portion of a periphery 510 of the first end 125 of the housing 105. In some examples, the lid sealant 500 can be positioned continuously along the entire periphery 510 of the first end of the housing 105.

Tab opening sealant 505 can be disposed between the cathode tab opening 200 and the cathode tab 115. The cathode tab opening 200 can include lateral surfaces 520 facing the cathode tab 115. The cathode tab 115 can include lateral surfaces 525 that face the lateral surfaces 520 of the cathode tab opening 200. The tab opening sealant 505 can be disposed between the lateral surfaces 520 of the cathode tab opening 200 and the lateral surfaces 525 of the cathode tab 115. In some examples, the tab opening sealant 505 can be disposed over a portion of the lateral surfaces 520 of the cathode tab opening 200. In some examples, the tab opening sealant 505 can be disposed over the entire area of the lateral surfaces 520 of the cathode tab opening 200.

Similarly, tab opening sealant 505 can be disposed between the anode tab opening 205 and the anode tab 120. The anode tab opening 205 can include lateral surfaces 530 facing the anode tab 120, and the anode tab 120 can include lateral surfaces 535 that face the lateral surfaces 530 of the anode tab opening 205. The tab opening sealant 505 can be disposed over a portion of, or an entirety of, the lateral surfaces 530 of the anode tab opening 205.

The lid sealant 500 and the tab opening sealant 505 can seal the contents such as the electrode structure 305 and electrolyte within the inner region 300 of the housing 105. The lid sealant 500 and the tab opening sealant 505 can contain gaseous build-up within the battery cell 100, up to at least a defined pressure threshold between 250 psi and 400 psi. The lid sealant 500 and the tab opening sealant 505 can contain the gaseous build-up without using vents to reduce pressure build up within the battery cell module. The lid sealant 500 and the tab opening sealant 505 can include materials such as epoxy and glass that can be applied in a molten or fluid state, but can solidify with the passage of time.

Figure 6:
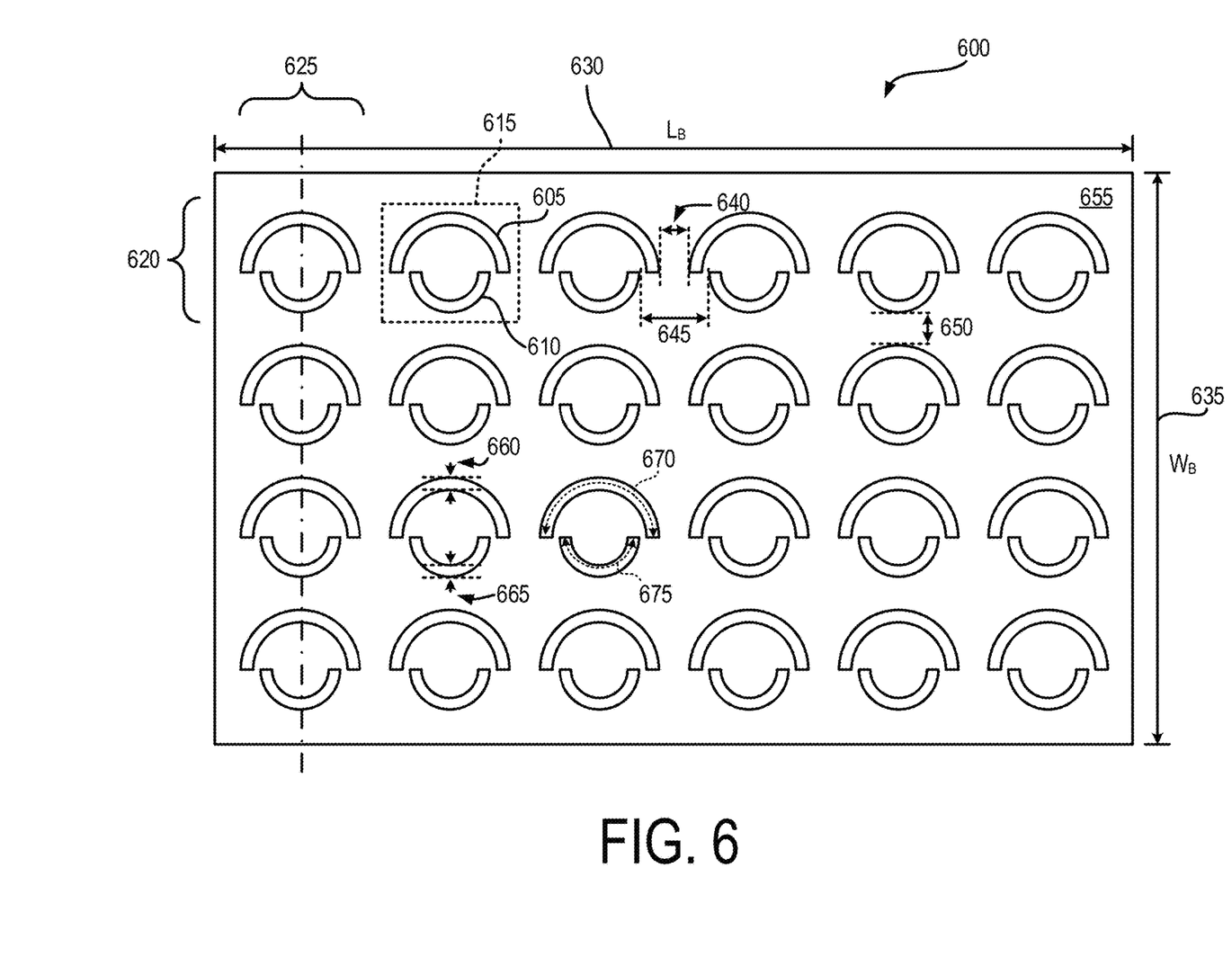
FIG. 6 shows a top view of a base including a plurality of anode and cathode sockets.

FIG. 6 shows a top view of a base 600 including a plurality of anode and cathode sockets. The base 600 includes a plurality of cathode sockets 605 and a plurality of anode sockets 610. Battery cells having cathode tabs and anode tabs can be plugged into the plurality of cathode sockets 605 and the plurality of anode sockets 610. The combination of the base 600 and the plugged in battery cells can form a battery cell module. The base 600 can have a base length (LB) 630 and a base width (WB) 635. In some examples, the base length 630 can have values between 120 mm and 160 mm, and the base width 635 can have values between 80 mm and 100 mm. The base length 630 can be equal to the base width 635. The base length 630 can be greater than the base width 635. The base 600 can have a rectangular shape. In some examples, the base 600 can have a circular, elliptical, or polygonal (regular or irregular) shape. The base 600 can be formed of materials such as plastics and polymers, or other electrically insulating or non-conductive material. The base 600 can include materials such as metals (e.g., stainless steel, Aluminum), for example, to improve the strength and structural stability of the base 600. The base 600 can be formed using thermally conducting materials, to conduct and transfer heat generated within the cathode sockets 605 and the anode sockets 610 to outside of the base 600.

The cathode sockets 605 and the anode sockets 610 can be arranged in a grid like fashion with rows 620 and columns 625 on the first surface 655. For example, the base 600 can include 4 rows and 6 columns of cathode sockets 605 and anode sockets 610. Each row 620 and column 625 can include a socket pair 615 of cathode sockets 605 and anode sockets 610. In some examples, the socket pairs 615 can be arranged in a staggered arrangement where socket pairs 615 in adjacent rows or adjacent columns are not aligned. In another example, the socket pairs 615 can be arranged in an irregular pattern. Adjacent cathode sockets 605 in the same row 620 can be spaced apart by a distance 640 that can have values between 1 mm and 2 mm. Adjacent anode sockets 610 in the same row 620 can be separated by a distance 645 that can have values between 4 mm and 5 mm. An anode socket 610 in one row can be separated by a cathode socket 605 in an adjacent row by a distance 650 that can have values between 1 mm and 2 mm. In some examples, the base 600 can include between 20 to 100 socket pairs 615.

The cathode sockets 605 and the anode sockets 610 can have openings or cavities defined in the first surface 655 of the base 600. The cathode tab 115 can be inserted or plugged into the cavity associated with the cathode socket 605, while the anode tab 120 can be inserted or plugged into the cavity associated with the anode socket 610. When assembled as a battery cell module, the first surface 655 of the base 600 can face battery cells plugged into the base 600. The cathode socket 605 can have a shape that can accommodate the corresponding shape of the cathode tab (115, FIG. 2), and the anode socket 610 can have a shape that can accommodate the corresponding shape of the anode tab (120, FIG. 2). For example, the cathode socket 604 can have a shape that conforms to the shape of the cathode tab of the respective battery cell. For example, the cathode socket 605 can have a circular arc shape, the same as or similar to the circular arc shape of the cathode tab 115 shown in FIG. 2. The anode socket 610 can have a circular arc shape, e.g., the same as or similar to the circular arc shape of the anode tab 120 shown in FIG. 2.

The cathode socket 605 can have dimensions (within the plane of the first surface 655) that are larger than the corresponding dimensions of the cathode tab 115. The larger dimensions of the cathode socket 604 can allow insertion of the cathode tab 115 through the opening in the cathode socket 604. For example, the width 660 of the opening in the cathode socket 605 can be greater than the thickness (215, FIG. 2) of the cathode tab 115. A length 670 of the opening of the cathode socket 605 can be greater than the length 245 of the cathode tab 115. Similarly, a width 665 of the opening of the anode socket 610 can be greater than the thickness 220 of the anode tab 120. A length 675 of the opening of the anode socket 610 can be greater than the length 250 of the anode tab 120. In some examples, the width 660 of the opening of the cathode socket 605 can have values between 1.2 mm and 1.7 mm, the length 670 of the opening of the cathode socket 605 can have values between 4.6 mm and 5.6 mm, the width 665 of the opening of the anode socket 610 can have values between 4.6 mm and 5.6 mm, and the length 675 of the opening of the anode socket 610 can have values between 3.6 mm and 4.6 mm.

The base 600 can include cathode sockets 605 of different sizes or shapes. That is, the shape or the dimensions of at least two cathode sockets on the base 600 can be different. This can allow battery cells that have cathode or anode tabs of different shapes and sizes to be plugged into the same base 600.

Figure 7:
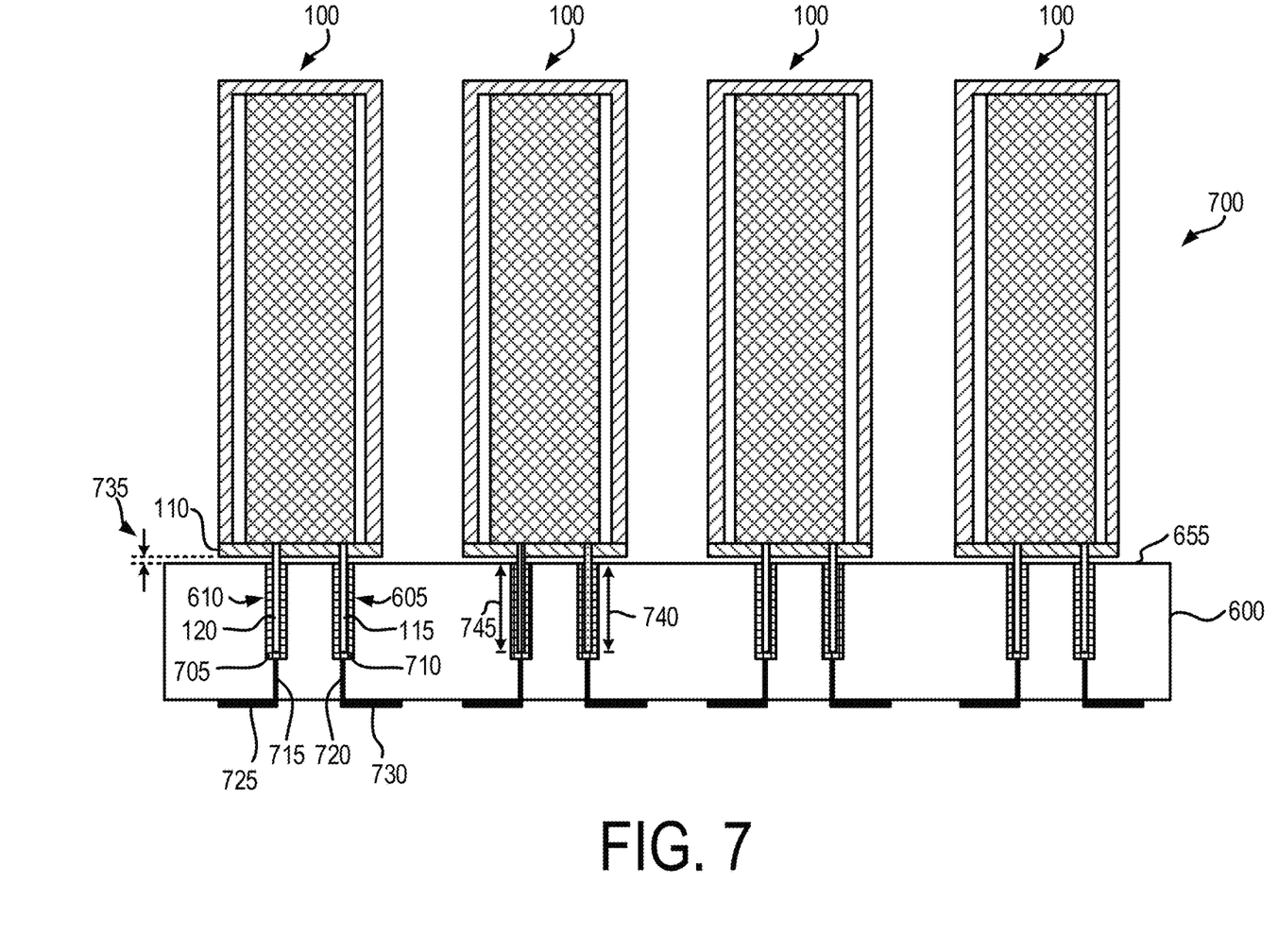
FIG. 7 shows a cross sectional view of a battery cell module.

FIG. 7 shows a cross sectional view of a battery cell module 700. In particular, FIG. 7 shows the cross-sectional view in a plane that is normal to the first surface (655, FIG. 6) of the base 600 and along the axis B-B (FIG. 6). The battery cell module 700 includes a plurality of battery cells 100 plugged into the base 600. Specifically, the cathode tab 115 of the battery cell 100 can be inserted into the cathode socket 605, and the anode tab 120 of the battery cell 100 can be inserted into the anode socket 610. The cathode socket 605 can include a cathode socket metal layer 710 that is disposed on the interior of the cathode socket 605. The cathode socket metal layer 710 can make electrical contact with the cathode tab 115. The base 600 also can include a cathode bus bar 730 and a cathode bus bar connector 720 that can electrically connect the cathode socket metal layer 710 to the cathode bus bar 730. The cathode bus bar 730 can be connected to cathode socket metal layers 710 of two or more cathode sockets 605. That is, the cathode bus bar 730 can carry electrical current associated with cathodes of at least two battery cells 100. Similarly, the anode socket 610 can include an anode socket metal layer 705 that is disposed on the interior of the anode socket 610. The anode socket metal layer 705 can make electrical contact with the anode tab 120. The base 600 also includes an anode bus bar 725 and an anode bus bar connector 715 that can electrically connect the anode socket metal layer 705 to the anode bus bar 725. The anode bus bar 725 can be connected to anode socket metal layers 705 of two or more anode sockets 610. That is, the anode bus bar 725 can carry electrical current associated with anodes of at least two battery cells 100.

The cathode socket metal layer 710 and the anode socket metal layer 705 can frictionally engage with the cathode tab 115 and the anode tab 120, respectively. The frictional engagement ensures that the cathode tab 115 and the anode tab 120, once inserted, are securely maintained in that position until a sufficient force is exerted to pull the cathode tab 115 and the anode tab 120 out of the cathode socket 605 and the anode socket 610. The thicknesses of the cathode socket metal layer 710 and the anode socket metal layer 705, in addition to factors such as the width (660, FIG. 6) of the opening in the cathode socket 605 and the shape of the cathode socket 605, can contribute to the degree of frictional engagement. As an example, the thickness of the cathode socket metal layer 710 and the anode socket metal layer 705 can have values between 0.5 mm and 1 mm.

The cathode socket metal layer 710 can be disposed over all the sidewalls of the cathode socket 605. In some examples, the cathode socket metal layer 710 can be disposed only on the lateral sidewalls of the cathode socket 605. The cathode socket metal layer 710 can be disposed continuously over the sidewalls of the cathode socket 605. In some examples, the cathode socket metal layer 710 can be disposed discontinuously over the sidewalls of the cathode socket 605. The anode socket metal layer 705 can be disposed over all sidewalls, or only the lateral sidewalls of the anode socket 610. Further the anode socket metal layer 705 can be disposed continuously or discontinuously over the sidewalls of the anode socket 610. The cathode socket 605 can have a depth 740 that is less than or equal to the height (150, FIG. 1) of the cathode tab 115. The anode socket 610 can have a depth 745 that is less than or equal to the height (150, FIG. 1) of the anode tab 120. As an example, the depth 740 of the cathode socket 605 can have values between 10 mm and 15 mm, and the depth 745 of the anode socket 610 can have values between 10 mm and 15 mm.

When inserted into the base, the lid 110 of the battery cell 100 can be separated from the base 600. Specifically, a gap 735 can be maintained between the lid 110 and the first surface 655 of the base 600. In some examples, the lid 110 of the battery cell 100 can make contact with the first surface 655 of the base 600. The gap 735 can have values between 0 mm and 0.5 mm. Maintaining a non-zero gap 735 between the battery cell 100 and the base 600 can allow use of cell extraction tools that can be positioned in the gap 735. The extraction tools can be used to pull the battery cell 100 from the base 600. Without a non-zero gap 735, the battery 100 would have to be pulled out by pulling on the housing 105. Pulling on the housing 105 can increase the risk of the lid 110 getting separated from the housing 105 due to an outward force exerted by the electrode structure 305 on the lid 110 during the pulling process. By using an extraction tool that pulls on the lid 110 instead of on the housing 105, the risk of the lid 110 detaching from the housing 105 can be reduced. In some examples, maintaining the lid 110 in contact with the base 600 can provide stability to the battery cell 100 and reduce the risk of bending or breakage of the cathode tab 115 and the anode tab 120. The presence of a non-zero gap 735 between the lid 110 and the base 600 can result in a rotational motion of the battery cell 100 that can cause bending of the cathode tab 115 and the anode tab 120. The amount of bending can increase with an increase in the magnitude of the gap 735. By positioning the battery cell 100 such that the lid 110 is flush in contact with the first surface 655 of the base, the rotational motion of the battery cell 100, and thereby the amount of bending of the cathode tab 115 and the anode tab 120 can be reduced.

One or more battery cell modules 700 can be assembled into a battery pack. The battery pack can have cathode and anode terminals, which can be connected to cathode and anode bus bars of the battery pack. The number of battery cell modules 700 within a battery pack can be based, in part, on the electrical specifications (such as voltage and current) of the battery pack as well as the dimensions of the battery pack.

Figure 8:
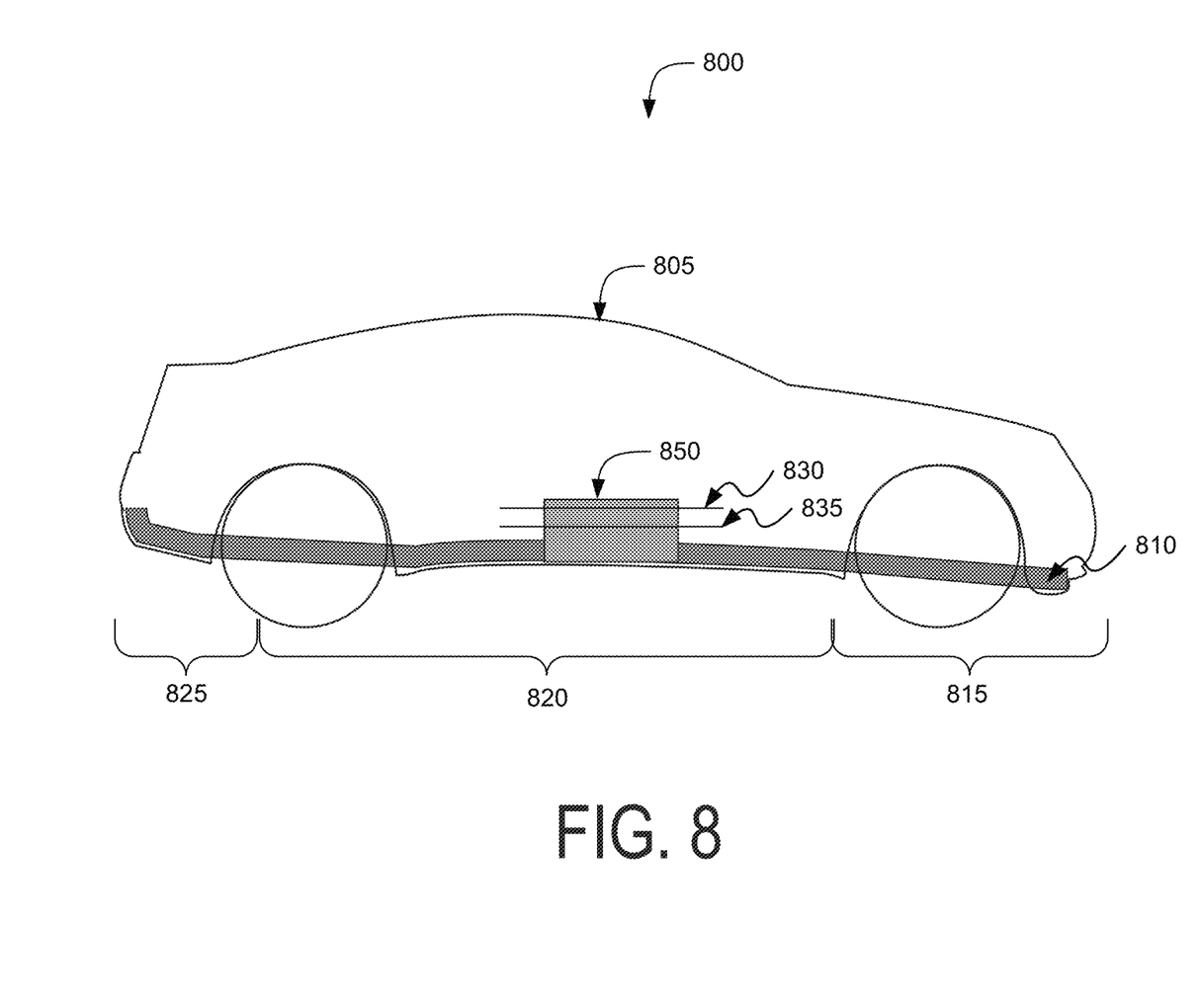
FIG. 8 is a block diagram depicting a cross-sectional view of an example electric vehicle installed with one or more battery packs.

FIG. 8 is a block diagram depicting a cross-sectional view 800 of an example electric vehicle installed with one or more battery packs 850. The electric vehicle 805 can include a chassis 810 (e.g., a frame, internal frame, or support structure). The chassis 810 can support various components of the electric vehicle 805. The chassis 810 can span a front portion 815 (e.g., a hood or bonnet portion), a body portion 820, and a rear portion 825 (e.g., a trunk portion) of the electric vehicle 805. The front portion 815 can extend between the front bumper and the front wheel well. The body portion 820 can extend between the front wheel well and the rear wheel well. The rear portion 825 can extend between the rear wheel well and the rear bumper. One or more battery pack(s) 850 can be installed or placed within the electric vehicle 805. The battery packs 850 can include one or more battery cell modules 700. The battery pack(s) 850 can be installed on the chassis 810 of the electric vehicle 805 within the front portion 815, the body portion 820 (as depicted in FIG. 8), or the rear portion 825. A first bus bar 830 and the second bus bar 835 can be connected or otherwise be electrically coupled to other electrical components of the electric vehicle 805 to provide electrical power. For example, the first bus bar 830 can be electrically connected to the cathode bus bar (730, FIG. 7) of the battery cell module (700, FIG. 7) and the second bus bar 835 can be electrically connected to the anode bus bar (725, FIG. 7) of the battery cell module (700, FIG. 7). As a result, the cathode tabs of one or more battery cells (FIG. 7, 100) can be connected to the first bus bar without including any wire bonding, and the anode tabs of one or more battery cells (FIG. 7, 100) can be connected to the second bus bar without any wire bonding. The first bus bar 830 and the second bus bar 835 can provide a path for the flow of electrical current to flow to and from the battery cells.

Figure 9:
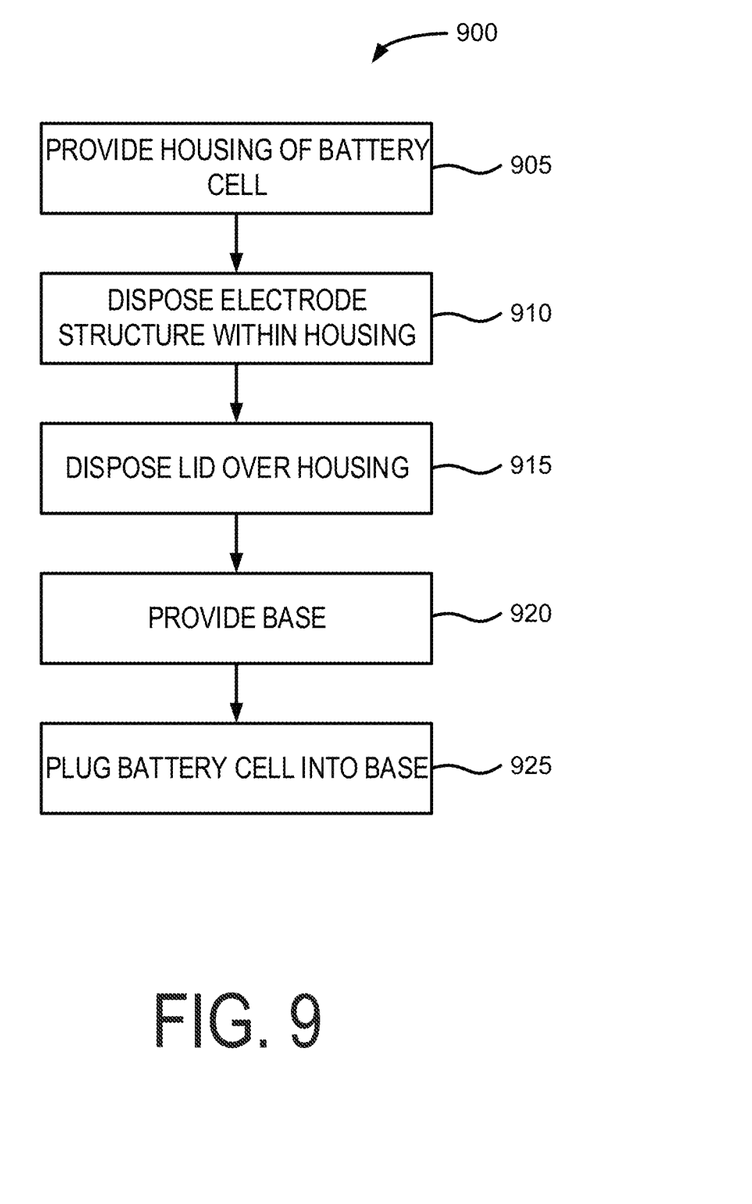
FIG. 9 depicts a method of providing a battery cell module of a battery pack to power an electric vehicle.

FIG. 9 depicts a method 900 of providing a battery cell module 700 of a battery pack 850 to power an electric vehicle 805. The method 900 can include providing a housing 105 of a battery cell 100 (ACT 905). For example, the method 900 can include providing the housing 105 with a first end 125 and a second end 130. The housing 105 can define an inner region 300. The housing 105 can be formed from a cylindrical casing with a circular, ovular, elliptical, rectangular, or square base or from a prismatic casing with a polygonal base.

The method 900 can include disposing an electrode structure 305 within the housing 105 (ACT 910). For example, the method 900 can include inserting an electrode structure 305 within the inner region 300 of the housing 105.

The electrode structure 305 can include a cathode tab 115 and an anode tab 120 that extend out of the first end 125 of the housing 105. As an example, the insertion can be carried out by an automated pick and place machine. The electrode structure 305 can be inserted in a manner such that the end of the electrode structure 305 that is opposite to the end where the cathode tab 115 and the anode tab 120 are disposed is inserted first. As an example, an electrolyte can be provided within the housing 105. The electrolyte can serve as a catalyst by promoting the movement of ions from the cathode to the anode of the electrode structure 305. The electrolytes can include liquids, gels, or dry polymers.

The method 900 can include disposing a lid 110 on the first end of the housing 105 (ACT 915). For example, the method 900 can include attaching a lid 110 to the first end of the housing 105, where the lid includes a cathode tab opening 200 and an anode tab opening 205. The lid 110 can be attached to the first end 125 of the housing 105 such that the cathode tab 115 extends through the cathode tab opening 200 and the anode tab 120 extends through the anode tab opening 205. The lid 110 can be attached to the first end 125 of the housing by using a lid sealant 500. For example, the lid sealant 500 can be applied between at least a portion of the lid 110 and at least a portion of the first end 125 of the housing 105. The lid sealant 500 can be positioned along at least a portion of a periphery 210 of the first end 125 of the housing 105. When applied, the lid sealant 500 can be in a fluid state and can be allowed to solidify over time. The lid sealant 500 can include epoxy or glass. The method 900 can include applying a cathode and anode tab opening sealant 505 between the anode and cathode tabs and the respective anode and cathode tab openings in the lid 110. The cathode and anode tab opening sealant 505 can applied to at least a portion of the sidewalls of the cathode and anode tabs and the respective cathode and anode tab openings in the lid 110.

The method 900 can include providing a base 600 (ACT 920). For example, the method 900 can include providing a base 600 including a plurality of cathode sockets 605 and a plurality of anode sockets 610. The base 600 can be formed of materials such as plastics and polymers, or other electrically insulating or non-conductive material. The base 600 can include materials such as metals (e.g., stainless steel, Aluminum), for example, to improve the strength and structural stability of the base 600. The base 600 can be formed using thermally conducting materials, to conduct and transfer heat generated within the cathode sockets 605 and the anode sockets 610 to outside of the base 600. The base 600 can be shaped using molding techniques in which the material used to form the base is poured in a fluid state into a mold and allowed to solidify. The cathode sockets 605 and the anode sockets 610 can have shapes that are similar to the shapes of the respective cathode tabs 115 and the anode tabs 120. The cathode sockets 605 and the anode sockets 610 can have dimensions that can allow the insertion of the respective cathode tabs 115 and the anode tabs 120.

The method 900 can include disposing a cathode bus bar 730 and an anode bus bar 725 on the base 600. Metal deposition techniques such as lithography can be used to deposit the cathode bus bar material and the anode bus bar material and to pattern the materials to form the cathode bus bar 730 and the anode bus bar 725. The cathode bus bar 730 can be formed of a conductive material such as aluminum, while the anode bus bar 725 can be formed of a conductive material such as copper.

The method 900 can include disposing a cathode socket metal layer 710 within the cathode socket 605 and disposing an anode socket metal layer 705 within the anode socket 610. In one example, the cathode socket metal layer 710 and the anode socket metal layer 705 can be pre-formed and inserted into the respective cathode socket 605 and the anode socket 610. The pre-formed metal layers can be shaped and sized appropriately to fit inside the respective sockets. In some examples, the metal layers can be deposited using sputtering or evaporation deposition techniques.

The method 900 can include disposing an adhesive within at least one cathode socket 605 and at least one anode socket 610 of the base. The adhesive can be used to bond the cathode tab 115 to the cathode socket 605 and the anode tab 120 to the anode socket 610. The adhesive can be inserted prior to the plugging in or insertion of the cathode and anode tabs into the base 600. The method 900 can include plugging the battery cell 100 into the base 600 (ACT 925). For example, the method 900 can include plugging the cathode tab 115 of the battery cell 100 into the cathode socket 605 and plugging the anode tab 120 of the battery cell 100 into the anode socket 610. The battery cell 100 can be plugged in using an automated pick and place machine. When plugging in the battery cell 100 into the base 600, a gap 735 can be maintained between the lid 110 of the battery cell and the first surface 655 of the base 600.

Figure 10:
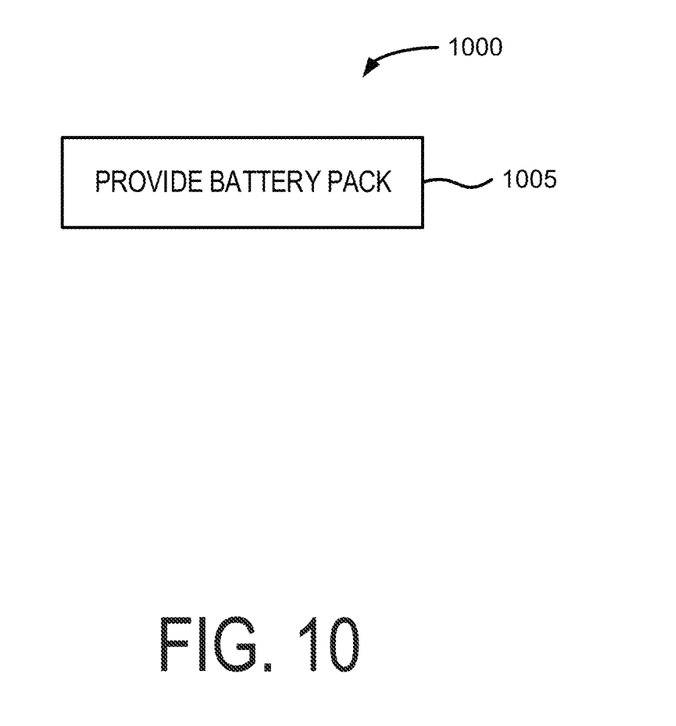
FIG. 10 depicts a method of providing a battery cell module of a battery pack to power an electric vehicle.

FIG. 10 depicts a method 1000 of providing a battery cell module 700 of a battery pack 850 for an electrical vehicle 805. The method 1000 can include providing a battery pack (ACT 1005). The battery pack 850 can include a battery cell module 700, which in turn includes a plurality of battery cells 100. Each battery cell 100 can include a housing 105 having a first end 125 and a second end 130. The housing 105 can define an inner region 300. The battery cell 100 can include an electrode structure 305 disposed in the inner region 300 defined by the housing 105. The electrode structure 305 can include a cathode tab 115 that extends from the first end 125 of the housing 105 and an anode tab 120 that extends from the first end 125 of the housing 105. The battery cell 100 includes a lid 110 coupled with the first end 125 of the housing 105. The lid 110 includes a cathode tab opening 200 and an anode tab opening 205. The cathode tab 115 extends through the cathode tab opening 200, and the anode tab 120 extends through the anode tab opening 205. The battery cell module 700 includes a base 600 having a plurality of cathode sockets 605 and a plurality of anode sockets 610. The plurality of cathode sockets 605 can receive respective cathode tabs 115 of a plurality of battery cells 100. The plurality of anode sockets 610 can receive respective anode tabs 120 of the plurality of battery cells 100.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, planar, perpendicular, vertical or other positioning or orientation descriptions include variations within +/−10% or +/−10 degrees of pure vertical, planar, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The invention claimed is:

1. A battery cell module of a battery pack to power an electric vehicle, the battery cell module comprising:
   a plurality of battery cells, each battery cell of the plurality of battery cells comprising:
      a housing having a first end and a second end, the housing defining an inner region,
      an electrode structure disposed in the inner region defined by the housing, the electrode structure comprising a cathode tab that extends from the first end of the housing, and an anode tab that extends from the first end of the housing,
      a lid coupled with the first end of the housing, the lid including a cathode tab opening and an anode tab opening, the cathode tab extending through the cathode tab opening and the anode tab extending through the anode tab opening;
   a base, different from the plurality of battery cells, the base including a first surface and a plurality of cathode sockets and a plurality of anode sockets that extend into the base at the first surface, the plurality of cathode sockets receiving respective cathode tabs of the plurality of battery cells and the plurality of anode sockets receiving respective anode tabs of the plurality of battery cells;
   the base including a cathode bus bar and an anode bus bar, the cathode bus bar electrically coupled with a cathode socket metal layer of at least two cathode sockets of the plurality of cathode sockets, and the anode bus bar electrically coupled with an anode socket metal layer of at least two anode sockets of the plurality of anode sockets.

2. The battery cell module of claim 1, comprising:
   the battery cell module disposed in the battery pack in the electric vehicle; and
   the battery pack coupled with a first bus bar and a second bus bar of the electric vehicle.

3. The battery cell module of claim 1, comprising:
   the plurality of cathode sockets electrically coupled with the respective cathode tabs of the plurality of battery cells and the plurality of anode sockets are electrically coupled with the respective anode tabs of the plurality of battery cells devoid of any welded joints.

4. The battery cell module of claim 1, comprising:
the cathode tab having a first curved shape and the anode tab having a second curved shape, wherein a length the cathode tab is greater than a length of the anode tab.

5. The battery cell module of claim 1, comprising:
the cathode tab having a first curved shape and the anode tab having a second curved shape, wherein a length of the anode tab is greater than a length of the cathode tab.

6. The battery cell module of claim 1, comprising:
the cathode tab having a first curved shape and the anode tab having a second curved shape, the cathode tab opening in the lid conforming to the first curved shape and the anode tab opening in the lid conforming to the second curved shape.

7. The battery cell module of claim 1, comprising:
the anode tab and the cathode tab positioned at unequal distances from a center of the lid.

8. The battery cell module of claim 1, comprising:
the cathode tab and the anode tab disposed to extend beyond the lid by 1 centimeter to 2 centimeters.

9. The battery cell module of claim 1, comprising:
a lid sealant disposed between at least a portion of the lid and at least a portion of the first end of the housing, the lid sealant positioned along a least a portion of a periphery of the first end of the housing.

10. The battery cell module of claim 9, wherein the lid sealant includes glass.

11. The battery cell module of claim 1, comprising:
a tab opening sealant disposed between the cathode tab and the cathode tab opening and the anode tab and the anode tab opening.

12. The battery cell module of claim 1, comprising:
the lid and the base separated by a distance of between 0.5 millimeters and 1 millimeters.

13. The battery cell module of claim 1, comprising:
the base including a first surface facing the plurality of battery cells, the plurality of cathode sockets and the plurality of anode sockets arranged in a grid on the first surface.

14. The battery cell module of claim 1, comprising:
adjacent cathode sockets of the plurality of cathode sockets separated by a distance of 1 millimeter.

15. The battery cell module of claim 1, comprising:
the base including between 20 and 100 cathode sockets.

16. The battery cell module of claim 1, comprising:
each of the at least two cathode sockets including the respective cathode socket metal layer disposed on an interior surface of the at least two cathode sockets, and each of the at least two anode sockets including the respective anode socket metal layer disposed on an interior surface of the at least two anode sockets.

17. The battery cell module of claim 1, comprising:
an adhesive disposed within at least one cathode socket of the plurality of cathode sockets to bond the at least one cathode socket with the respective cathode tab.

18. A method of providing a battery cell module of a battery pack according to claim 1 to power an electric vehicle, comprising:
providing a plurality of battery cells, for each of the plurality of battery cells:
providing a housing having a first end and a second end, the housing defining an inner region,
disposing an electrode structure in the inner region defined by the housing, the electrode structure comprising a cathode tab and an anode tab extending out of the first end of the housing,
disposing a lid proximate to the first end of the housing, the lid having a cathode tab opening and an anode tab opening, the cathode tab extending through the cathode tab opening and the anode tab extending through the anode tab opening;
providing a base, different from the plurality of battery cells, including a first surface and a plurality of cathode sockets and a plurality of anode sockets that extend into the base at the first surface;
plugging the cathode tab of each of the plurality of battery cells into the respective cathode socket of the plurality of cathode sockets and plugging the anode tab of each of the plurality of battery cells into the respective anode socket of the plurality of anode sockets;
electrically coupling a cathode bus bar of the base with a cathode socket metal layer of at least two cathode sockets of the plurality of cathode sockets; and
electrically coupling an anode bus bar of the base with an anode socket metal layer of at least two anode sockets of the plurality of anode sockets.

19. An electric vehicle, comprising:
a battery cell module of a battery pack to power an electric vehicle, the battery cell module comprising:
a plurality of battery cells, each battery cell of the plurality of battery cells comprising:
a housing having a first end and a second end, the housing defining an inner region,
an electrode structure disposed in the inner region defined by the housing, the electrode structure comprising a cathode tab that extends from the first end of the housing, and an anode tab that extends from the first end of the housing,
a lid coupled with the first end of the housing, the lid including a cathode tab opening and an anode tab opening, the cathode tab extending through the cathode tab opening and the anode tab extending through the anode tab opening;
a base, different from the plurality of battery cells, the base including a first surface and a plurality of cathode sockets and a plurality of anode sockets that extend into the base at the first surface, the plurality of cathode sockets receiving respective cathode tabs of the plurality of battery cells and the plurality of anode sockets receiving respective anode tabs of the plurality of battery cells; and
the base including a cathode bus bar and an anode bus bar, the cathode bus bar electrically coupled with a cathode socket metal layer of at least two cathode sockets of the plurality of cathode sockets, and the anode bus bar electrically coupled with an anode socket metal layer of at least two anode sockets of the plurality of anode sockets.

* * * * *